United States Patent [19]
Burkholder

[11] Patent Number: 5,145,220
[45] Date of Patent: Sep. 8, 1992

[54] PIPE FITTING

[76] Inventor: Jack Burkholder, 7948 E. 59 Place South, Apartment 55-3, Tulsa, Okla. 74145

[21] Appl. No.: 712,466

[22] Filed: Jun. 10, 1991

[51] Int. Cl.$^5$ .............................................. F16L 19/08
[52] U.S. Cl. ..................................... 285/374; 285/423
[58] Field of Search ............... 285/374, 373, 369, 114, 285/419, 423

[56] References Cited

U.S. PATENT DOCUMENTS

| | | | |
|---|---|---|---|
| 2,776,153 | 1/1957 | Smith | 285/373 L |
| 3,229,998 | 1/1966 | Pennington | 285/419 |
| 4,045,060 | 8/1977 | Daigle | 285/369 |
| 4,092,036 | 5/1978 | Sato et al. | 285/374 X |
| 4,421,347 | 12/1983 | Kantor | 285/369 |
| 4,609,210 | 9/1986 | Torokvei | 285/373 X |

Primary Examiner—Dave W. Arola
Attorney, Agent, or Firm—William S. Dorman

[57] ABSTRACT

An assembly for joining a section of pipe to a pipe fitting in which the pipe may be inserted into the fitting. The open face of the fitting has several J-shaped locks around its periphery into which locking lugs on a locking clamp may be inserted. The locking clamp includes a first and second locking clamp element each one being an annular one-half ring with a prong at one end and a cavity at the other to form a ring. The locking lug is on each such element and is adapted to fit into the J-shaped lock on the pipe fitting. The inner surface of the annular ring is provided with blades for embedment into the outside wall of the pipe as the two half rings are pulled together by tightening the bolts.

3 Claims, 5 Drawing Sheets

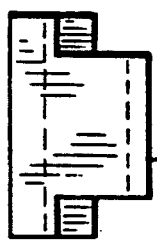
Fig. 17
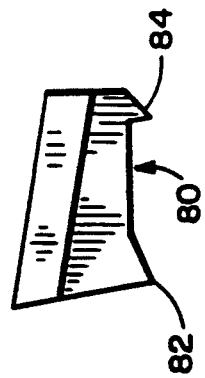
Fig. 18
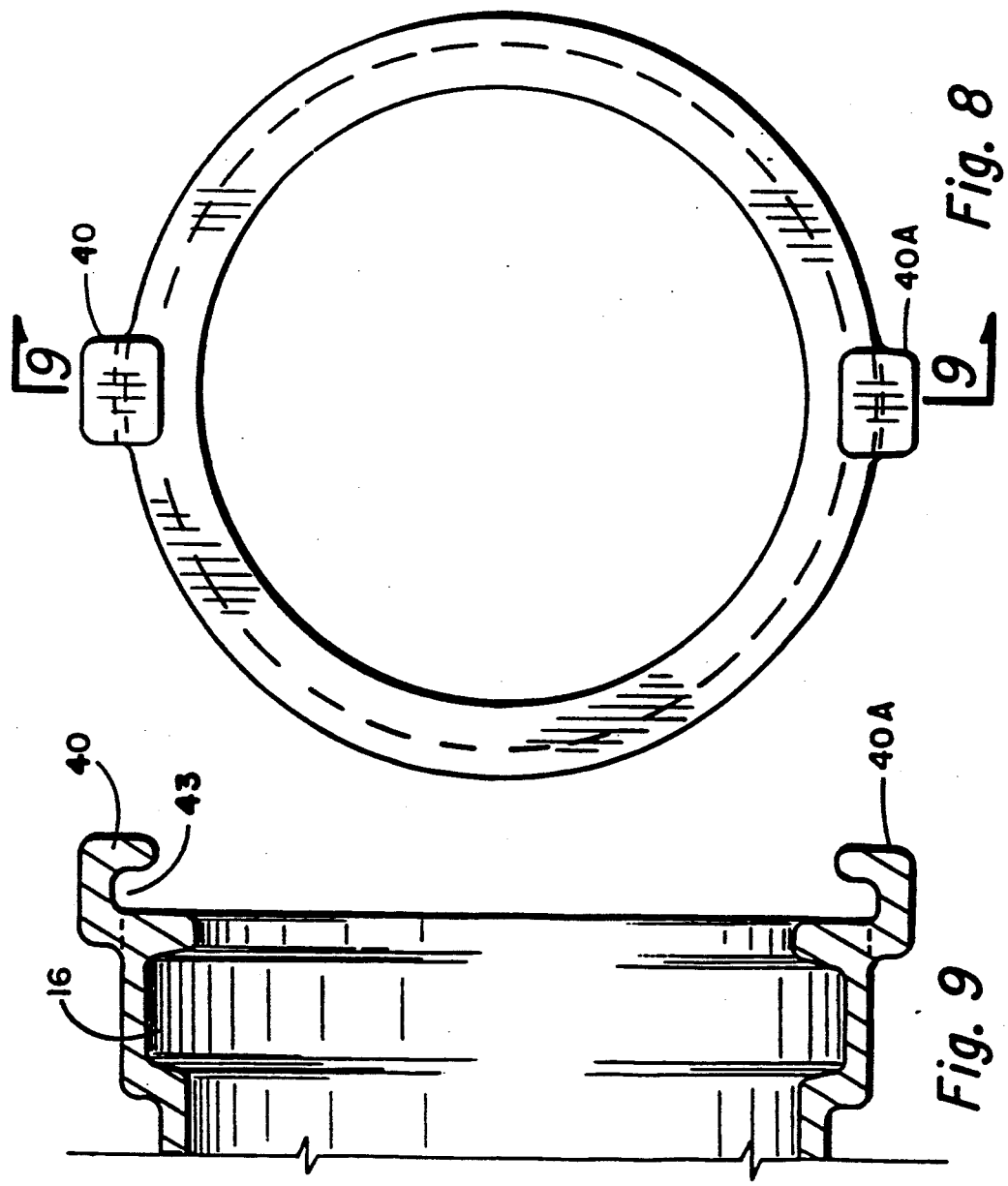
Fig. 8
Fig. 9

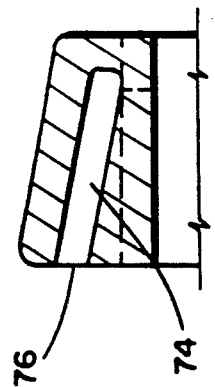
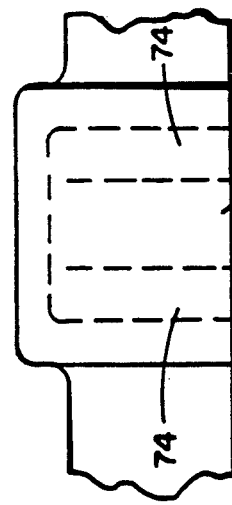
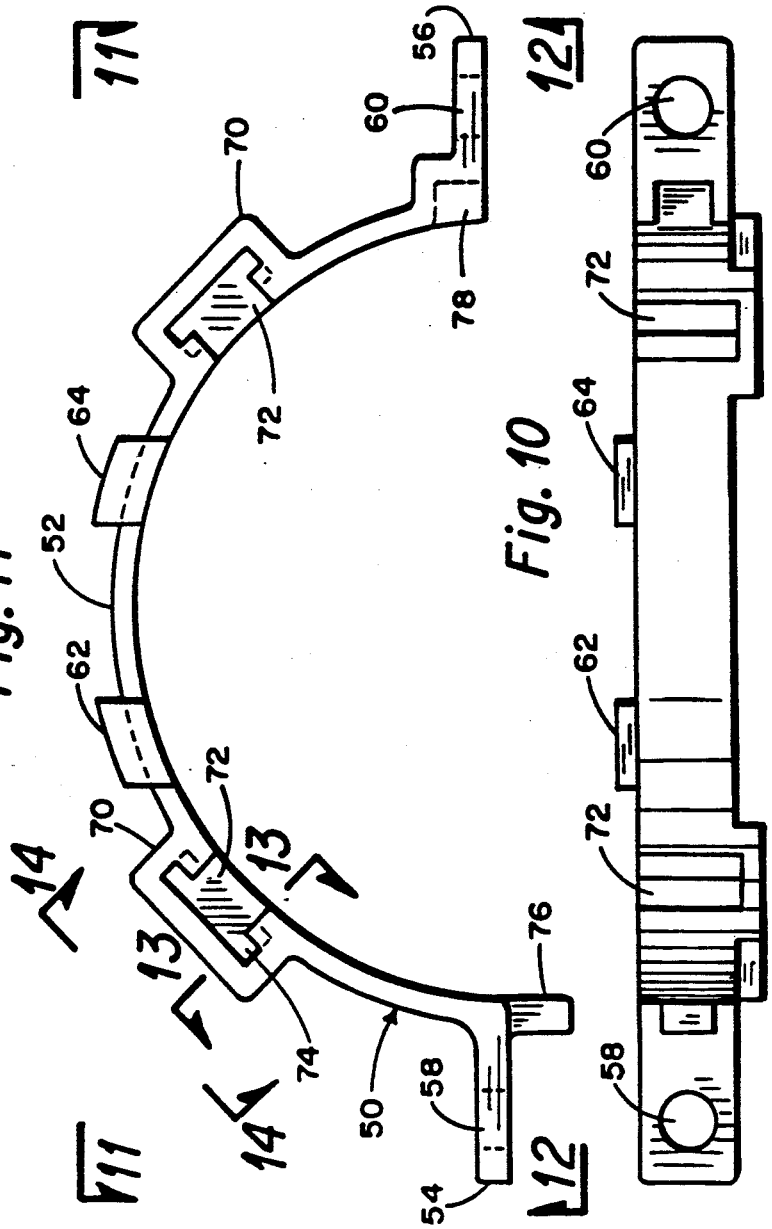

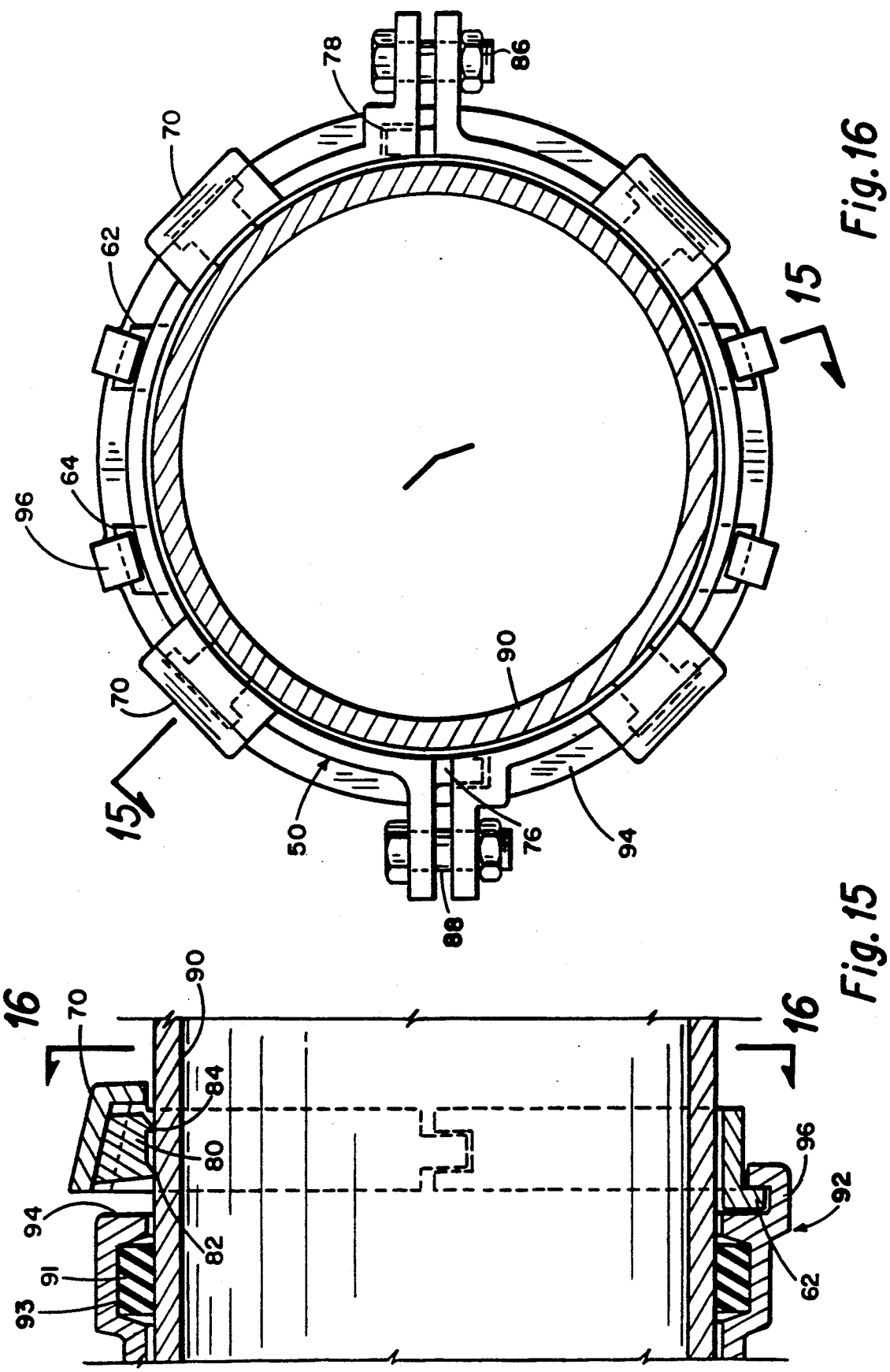

PIPE FITTING

BACKGROUND OF THE INVENTION

1. Field of the Invention

The present invention is related to an assembly for joining a section of pipe to a pipe fitting and is more particularly directed to an improved assembly which can be used for connecting a pair of axially aligned conduits firmly together and for preventing the conduits from separating when in use.

2. Description of the Prior Art

Several types of pipe junction holders with disengagement preventing means are known in the prior art. One such system is shown in the U.S. Pat. No. 4,092,036, issued to Sato et al on May 30, 1978. As stated therein, one common type of conventional pipe junction holder comprises a substantially annular body having a plurality of through holes with internal threads, each of the threaded holes being formed so as to readily extend so that its central line may meet at right angles to the longitudinal axis of the aligned pipes. A plurality of bolts are inserted through the holes, each of the bolts having a threaded shank which is normal to the pipe periphery and which passes through the hole so as to engage with the internal threads thereof. These prior art devices include a plurality of push members which are respectively interposed between the bottom end of the threaded shank and the peripheral surface of the pipe on which the pipe junction holder is mounted, each of said push member having at one side a rough, anti-sliding surface which is in contact with the peripheral surface of the pipe.

The patent to Sato et al, supra, describes one of the recent developments in this area. The patent discloses a pipe junction holder having a substantially annular body with which are formed a plurality of spaced clamping blocks comprising a vertical front wall, a pair of vertical side walls, and a lateral top wall. The lateral top wall extends descendingly or downwardly away from the front wall and is formed with a non-threaded hole which is elliptical in shape and which extends with an inclination relative to the longitudinal axis of the pipe on which the pipe junction holder is mounted. Within the hole is received a bolt having a shank with an integral annular flange formed therewith, in such a manner that an upper slatted surface of such an annular flange is slidable along a lower slanted surface of the top wall.

Although this last mentioned pipe junction holder works reasonably well, it still contains a rather large number of bolts and tapped threaded holes that need to be made. Of course, these are expensive. It is thus an object of this invention to provide an assembly for joining a section of pipe to a pipe fitting wherein no tapped holes in the assembly are required.

As the result of a search conducted on the present invention, Applicant is aware of the following additional United States Patents:

| Inventor | U.S. Pat. No. | Issue date |
| --- | --- | --- |
| C. B. Reynolds | 1,929,826 | October 10, 1933 |
| Y. Mathieu | 2,543,185 | February 27, 1951 |
| R. C. Boughton | 2,969,995 | January 31, 1961 |
| Rosaire Daigle | 4,045,060 | August 30, 1977 |
| Charles W. Roche | 4,372,587 | February 8, 1983 |
| Yamaji et al. | 4,417,754 | November 29, 1983 |

None of the above patents is deemed sufficiently pertinent to require any further comment.

SUMMARY OF THE INVENTION

This is an assembly for joining a section of pipe to a pipe fitting in which no tapped holes are required. The pipe fitting has a face or hub which is provided with a plurality of J-shaped lock members on the open end. A locking clamp is provided with lugs for locking the pipe to the pipe fitting. This locking clamp is made of two half-circular ring shaped elements. The end of each half ring is provided with tabs with holes in them and the tab extends perpendicular to the tangent at the ends of the half ring. Each of the half rings is provided with a prong at one end and a cavity at the other. When the two are placed together to form a complete ring such that the cavity of one half ring receives the prong of the other to form a stable ring. Bolts are placed through the aligned holes and the nuts on each bolt are tightened down. Each of the half rings has an inner blade which, when the bolts are tightened, is embedded into the outer wall of the pipe section. Prior to tightening the bolts the locking lugs on the outer periphery of each locking clamp element are rotated into the J-lock on the pipe fitting.

If the assembly is used with a section of metallic pipe, special wedges are provided for fitting into pockets on the periphery of each locking clamp element

BRIEF DESCRIPTION OF THE DRAWINGS

FIG. 8 is a front view of a modified pipe fitting of my invention.

FIG. 9 is a cross-sectional view taken along line 9—9 of FIG. 8.

FIG. 10 is a front elevation of one of two elements which make up a locking clamp for use with metal pipe and is a modification of the element of FIG. 1.

FIG. 11 is a top view taken along the line 11—11 of FIG. 10.

FIG. 12 is a bottom view taken along the line 12—12 of FIG. 10.

FIG. 13 is a sectional view taken along the line 13—13 of FIG. 10.

FIG. 14 is a fragmentary view taken along the line 14—14 of FIG. 10.

FIG. 15 is a longitudinal cross-sectional view along a piece of metal pipe partly in section illustrating connecting the metal pipe to a modified pipe fitting and using the elements shown in FIG. 10.

FIG. 16 is a view taken along the line 16—16 of FIG. 15.

FIG. 17 is an end view of the wedge used in the clamping elements shown in FIGS. 15 and 16.

FIG. 18 is a side view of the wedge of FIG. 17.

DETAILED DESCRIPTION OF THE PREFERRED EMBODIMENTS

The present invention is useful for connecting a section of pipe to a pipe fitting. The apparatus for connecting a plastic pipe to a fitting will first be described and then the embodiment for connecting a metal pipe to a pipe fitting will be described later.

Figure 7:
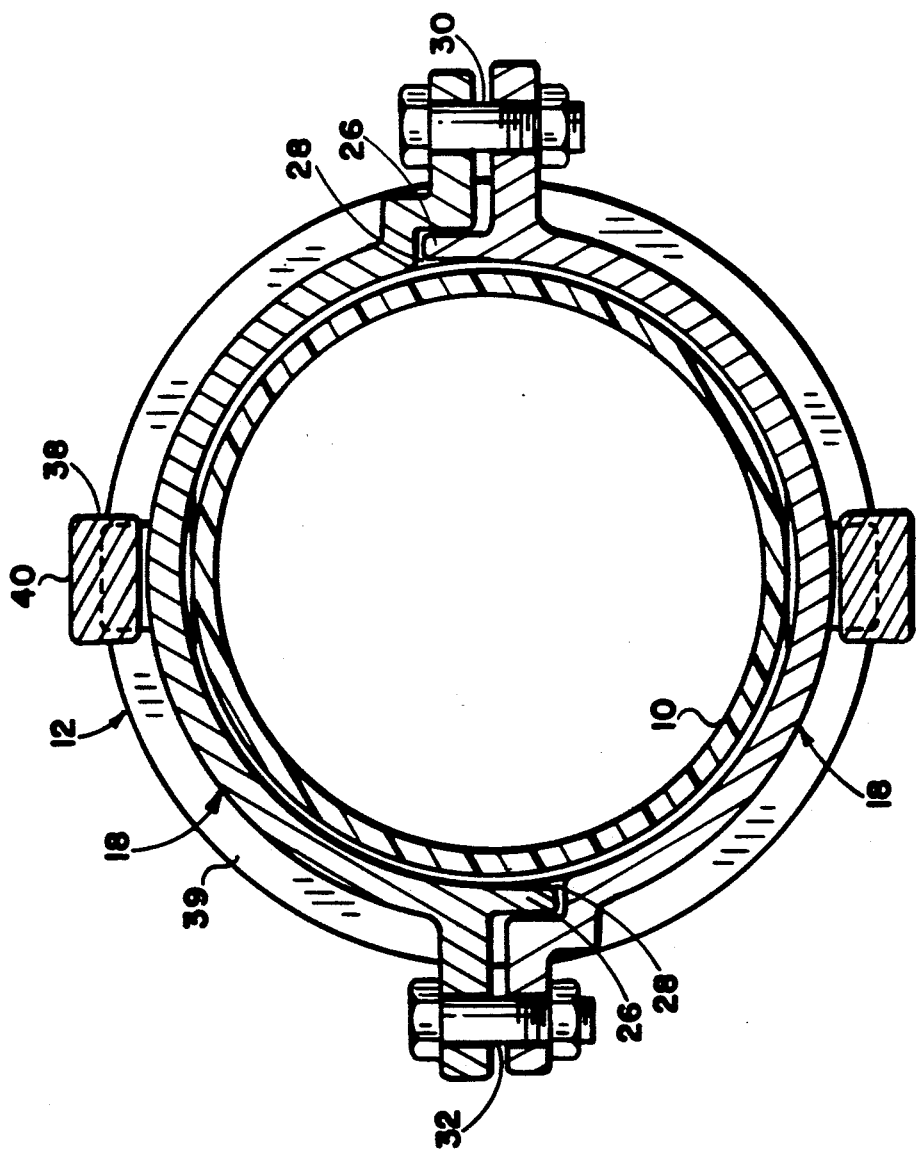
FIG. 7 is a traverse cross-sectional view taken along the line 7—7 of FIG. 6.
Figure 6:
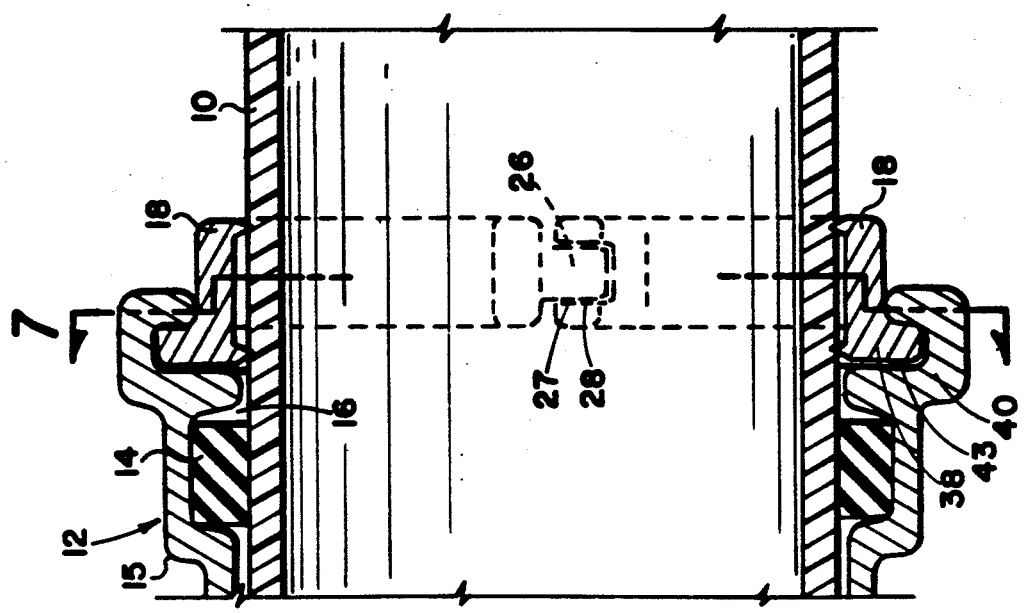
FIG. 6 is a longitudinal cross sectional view along a section of plastic pipe showing the locking clamp of FIG. 1 in use with a locking lug of a fitting used to connect the plastic pipe to the fitting.

As shown in FIGS. 6 and 7, it is frequently desired to connect a plastic pipe 10 to a fitting 12 which has a gasket 14 set in a groove 16 to form a seal between the pipe fitting and the outer wall of the pipe 10. To accomplish this, a two element locking clamp is used to make a locking clamp, one such element being shown as element 18 in FIG. 1. This element is essentially a semi-circular or half ring locking clamp section 20 which has a left tab 22 and a right tab 24. A prong 26 is provided at one end of semi-circular section 20 at which tab 24 is positioned. Cavity 28 is of a size to receive a prong 26 from a locking clamp element such as element 18.

The manner in which two complementary clamping elements 18 fit together is illustrated in FIG. 7. Shown thereon is a first locking clamping element 18 and a second complementary or symmetrical locking clamp element also designated by the reference numeral 18. Prong 26 of first element 18 fits snugly in cavity 28 of the second element 18 and likewise prong 26 of element 18 fits snugly into cavity 28 of the first locking clamp element 18. The clearance 27 between the prong 26 and the cavity 28 is small enough to give a very snug fit and typically may be in the range of 0.010 inches. Tabs 22 and 24 of the locking clamp element are provided with holes 34 and 36, respectively, through which the bolts 30 and 32 are inserted. As will be more fully explained, the prongs 26 and cavities and 28 are useful to reduce the side load on bolts 30 and 32 which connects and holds first locking clamp element 18 and second locking clamp element 18 together as shown in FIG. 7.

Figure 3:
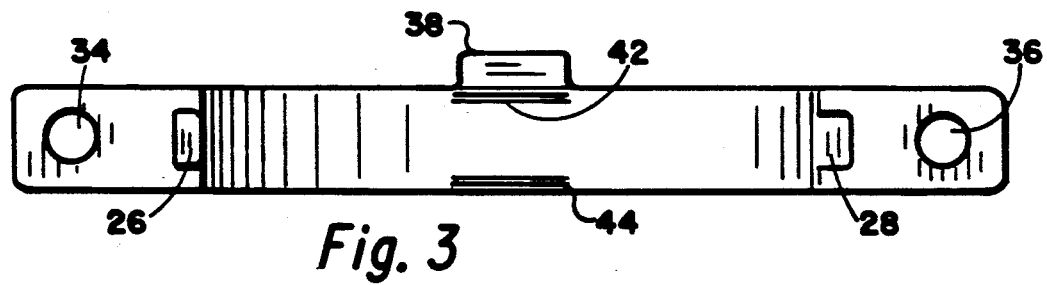
FIG. 3 is a bottom view taken along the line 3—3 of FIG. 1.
Figure 5:
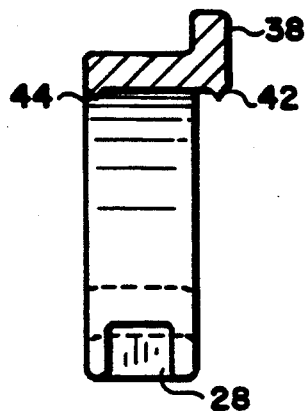
FIG. 5 is a sectional view taken along the line 5—5 of FIG. 1.
Figure 4:
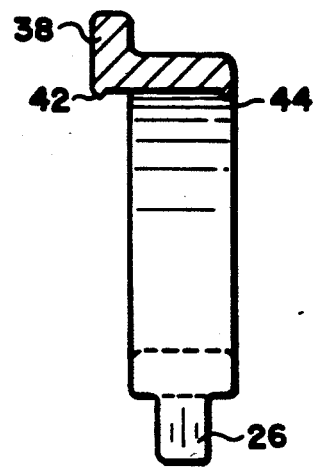
FIG. 4 is a sectional view taken along the line 4—4 of FIG. 1.

The manner in which the two complementary locking clamp elements 18 are secured together has been described above. Attention is redirected to FIGS. 1 through 5 to illustrate means including lug 38 for securing the locking clamp to pipe 10. Attention is directed to FIGS. 8 and 9 which show the end of a coupling 12 for the pipe fitting. Shown thereon is lock 40 having lock recess 43 into which a locking lug 38 may be inserted. The locking lug 38 is also shown in FIG. 6 and cooperates with the lock 40 for locking the lug 38 to the pipe fitting. As shown in FIG. 3 on the inside of locking element 18 adjacent lug 38 is a first blade 42 and a second blade 44. As can be send in FIG. 1, the bottom edge 46 of blades 42 and 44 are straight. It is considered that having the bottom side 46 of the blades straight that it will embed better into the plastic pipe. Preferably, additional blades 42 and 44 can be located around the periphery of element 18.

A brief description will now be given of how to use the clamping and locking mechanism to connect plastic pipe 10 to fitting 12. Gasket 14 is first inserted into groove 16 of the hub 15 of the fitting 12. The pipe 10 is next inserted into the position shown in FIG. 6 so that the end is beyond the sealing gasket 14. Care must be exercised so that the end of the pipe 10 does not damage the gasket 14. One way of accomplishing this is to properly prepare the end of the pipe before inserting it. This can be done by beveling the end so that there are no sharp edges contacting the gasket. Another way of doing this is by use of a nose cone fitted over the end of the pipe 10. After pipe 10 has been seated in the pipe fitting 12, a locking clamp element 18 is placed on top of the pipe such that lock 38 is adjacent the hub 39 which will be the position shown in FIG. 6. An identical lock clamp element 18 is arranged with respect to the first clamp 18 so that, prongs 26 of each element fit into cavity 28 of the other element. Nuts 30 and 32 are inserted through the respective holes of side mounted tabs 22 and 24 and the nuts thereon are loosely tightened. The locking clamp is caused to slide up against the face of hub 38 of the pipe fitting with the lugs 38 not aligned with the lock 40 for the locking lugs. At this point the locking clamp is rotated so that the lugs 38 are rotated into lock 40 as shown in FIGS. 6 and 7. The bolts 30 and 32 are then tightened to a predetermined torque. The blades 42 and 44 will bite into the wall of the plastic pipe 10 as these bolts are tightened. One can insure that the blades will cut into the pipe or embed into the wall thereof by striking the periphery of the locking clamp with a hammer.

Without prongs 26, when fluid such as water is injected under pressure into the pipe 10, experience has shown that clamping elements 18 would tend to rotate relative to the connection between the lugs 38 and locks 40, thus generating a side force on bolts 30 and 32. When a great axial pressure produced by the liquid flow acts on the internal wall of the pipe so that the pipe is forced to move slightly outwardly and tends to exert a rotating force on clamping elements 18, by using prongs 26 in cavities 28, and keeping a small clearance, the prongs and cavity will resist any tendency for the clamping elements to rotate and thus prevent the bolts from breaking.

Attention will now be directed toward the embodiment of the clamping ring which is useful for use with a metal pipe. Attention is therefore next directed to FIGS. 10 through 14 to show the locking clamp embodiment which is especially useful for use with metal pipe. Shown thereon is locking clamp element 50 which as shown in FIG. 10 is a semi-circular clamp or annular ring or band 52 which has side mounting tabs 54 and 56 with holes 58 and 60 therein. Locking clamp element 50 is provided with two locking lugs 62 and 64 which are very similar to locking lug 38 of FIG. 1, except that these two lugs do not have a blade similar to blade 46. These lugs are for locking into locks 96 for example of FIGS. 15 and 16. As shown in the drawings, especially FIGS. 10, 11, 12 and 16, there are two pocket housings 70 on each locking clamp element 50 with each having a pocket 72. These pockets 72 are Tee-shaped and have an inclined channel 74 so that pocket 72 is essentially in the shape of a Tee. Pocket 72 opens on the front at mouth 76 as shown in FIG. 13.

Figure 2:
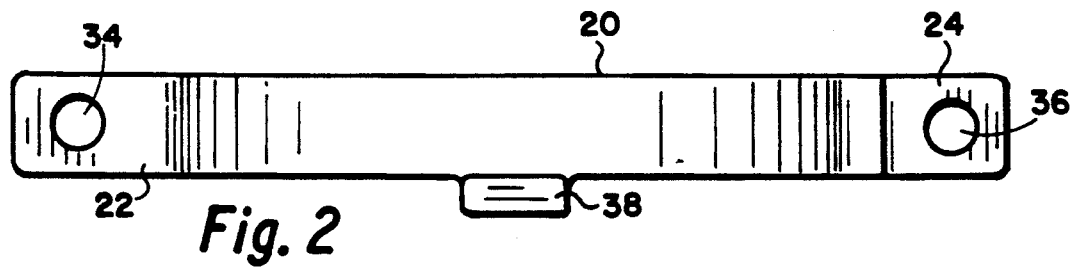
FIG. 2 is a top plan view taken along the line 2—2 of FIG. 1.
Figure 1:
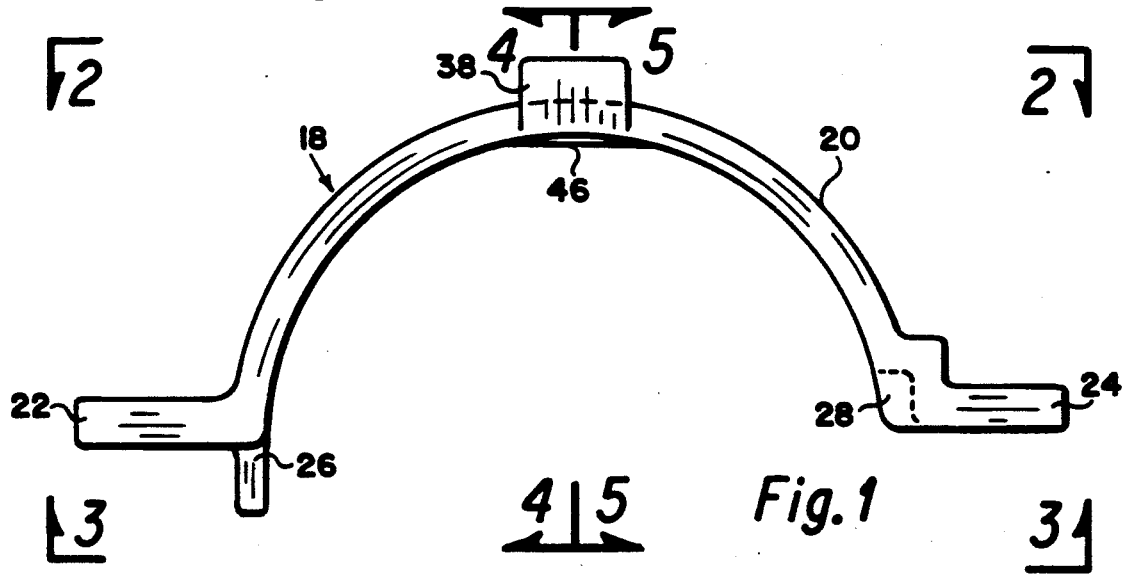
FIG. 1 is a front elevational view of one of two elements which make up the locking clamp for use with a pipe fitting.

Each locking clamp element 50 has a prong 76 and cavity 78 similar to prongs 26 and cavity 28 of the locking clamp element 18 of FIG. 1.

Wedge 80 is shown in FIGS. 17 and 18 and is inserted in pocket 70 as indicated in FIG. 15. The bottom of wedge 80 has blades 82 and 84. As shown in FIG. 17, the bottom of blades 82 and 84 essentially straight lines.

The following describes the way to make up the assembly shown in FIG. 15 wherein a metal pipe 90 is to be inserted into fitting 92 which has a forward face 94 and a lock 96. To make the assembly a seal 91 is first inserted into groove 93 of the fitting 92. Next pipe 90 is inserted so that it does not do damage to seal 91. When the pipe is thus set in the fitting 92, a first and second locking clamp element 50 is placed about the pipe 90 such that the prong 76 of each locking clamp element 50 is received in the cavity 78 of the other. Care must be taken that the opening 76 of the locking clamp is assembled such that the mouth 76 of the pocket 72 faces the face 94 of the fitting that is shown in FIG. 15. In order to prevent the wedges from falling out of the pockets, an adhesive tape is placed across the opening of the pocket housing and the front face of the wedge. The two locking clamp elements 50 are connected together by side bolts 86, 88 to form a loose connection. The assembled locking clamp is then shoved toward the face 94 of the fitting 92. At this point, it is necessary that locking lugs 62 are not aligned with locks 66. As soon as the contact is made with the face 94, the locking clamp is rotated so that locking lugs 62 are in locks 96 as shown in FIGS. 15 and 16. The side bolts are then tightened. A hammer is then used to strike the upper surface of the pocket housing 70 to indent the blades 82 and 84 into the pipe 90 which is in this example is ductile iron. The bolts 86 and 88 are then tightened and each of the pockets 70 is again struck with a hammer. This procedure is repeated until the side bolts are drawn up to a predetermined torque. It is anticipated that each pocket 70 will have to be struck at two different times. Pressure on the end of the pipe 90 will tend to move the pipe 90 out of the fitting 92. However, pocket housing 70 is secured to the locking clamp which is secured to locks 96 and cannot move away from it. Therefore any attempted movement of the wedge 80 will only cause it to be embedded more firmly and deeply into the wall of pipe 90 because the pocket 70 is provided with the inclined channel 74. Again, here similarly as in the assembly described above for plastic pipe, the prongs and cavity resists or prevents the locking clamp from rolling.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An assembly for joining a section of pipe to a pipe fitting which comprises:

first and second locking clamp elements adapted to surround the section of pipe, each element being an annular one-half with a prong at one end and a cavity at an opposite end, the size of the cavity of each one-half ring being such that it snugly receives the prong of the other one-half ring to form a closed ring when the locking clamp elements are positioned to surround the section of pipe, each said one-half ring having a locking lug extending outwardly from the periphery thereof;

a pipe fitting having an open end into which said section of pipe may be inserted, said pipe fitting having a plurality of lock members on its open end, each lock member being provided with a lock recess for receiving one of said locking lugs;

forcing means to force said two one-half rings toward each other comprising a tab extending radially outward from each end of each one-half ring with holes therethrough and positioned so that when the two one-half rings are shaped to form a ring that the hole on each tab of one-half ring is aligned with a corresponding hole in each tab on the other one-half ring and bolts extending through said aligned holes;

blade means on the inner periphery of each one-half ring for embedding into the said section of pipe when the bolts are fully tightened;

whereby, the locking clamp elements are first placed in surrounding relationship with respect to the section of pipe, the bolts are loosely tightened, the assembly of locking clamp elements is thereafter rotated around the pipe section until the locking lugs are received in the lock recesses of the locks on the pipe fitting, after which the bolts are fully tightened to cause the blade means to become imbedded in the section of pipe; and whereby the prongs are fully received in the cavities to prevent any side forces from being exerted against the bolts.

2. An apparatus as defined in claim 1 in which each said one-half ring contains at least one pocket housing having a pocket with an open end; wherein said blade means comprises a wedge having a first blade and a second blade each said blade having a straight edge, each wedge being insertable into the open end of the pocket.

3. An assembly as defined in claim 2 in which said wedge is T-shaped and the top of the T slanting from the side where one blade is to the side where the second blade is.

* * * * *